United States Patent [19]
Wittgenstein, deceased et al.

[11] 3,951,437
[45] Apr. 20, 1976

[54] CONSTRUCTION OF ENCASED PIPELINES
[75] Inventors: Gérard F. Wittgenstein, deceased, late of Lausanne, Switzerland; by Raymond Pache, executor, Lausanne, Switzerland
[73] Assignee: Les Fils d'Auguste Scheuchzer S. A., Lausanne, Switzerland
[22] Filed: Sept. 17, 1974
[21] Appl. No.: 506,873

[30] Foreign Application Priority Data
Sept. 20, 1973 Switzerland.................... 13546/73

[52] U.S. Cl............................... 285/47; 29/455 R; 138/106; 285/286
[51] Int. Cl.²........................................ F16L 55/00
[58] Field of Search................ 285/47, 53, 93, 286; 138/106; 29/455

[56] References Cited
UNITED STATES PATENTS

| | | | |
|---|---|---|---|
| 2,894,538 | 7/1959 | Wilson.................................. 285/53 |
| 3,530,024 | 9/1970 | Wittgenstein.................... 138/106 X |
| 3,744,823 | 7/1973 | Muir et al.......................... 285/47 X |
| 3,801,140 | 4/1974 | Keller................................... 285/47 |
| 3,802,456 | 4/1974 | Wittgenstein..................... 285/93 X |

Primary Examiner—Thomas F. Callaghan
Attorney, Agent, or Firm—Robert E. Burns; Emmanuel J. Lobato; Bruce L. Adams

[57] ABSTRACT

A pipeline includes a plurality of units each consisting of a pipe section, a netting of longitudinal inserts about the pipe section and a slotted primary outer jacket the edges of which are folded down into an outer groove of one of the inserts which is then filled with a hardenable material providing fluid-tight closure. The jacket section is shorter than the inserts, which are shorter than the pipe section whereby each unit has stepped ends. The ends of the pipe sections of adjacent units are welded together with the grooved inserts aligned, and joining sections of the netting are wrapped about the pipe ends. Secondary sections of the slotted jacket, previously placed over the primary jacket sections of the units, are then slid between the primary jacket sections and secured by folding down the edges thereof into the aligned grooves of the grooved inserts. Then the grooves along the secondary jacket sections are filled with hardenable material and flexible joints are bound between the adjacent ends of the jacket sections.

8 Claims, 7 Drawing Figures

CONSTRUCTION OF ENCASED PIPELINES

BACKGROUND OF THE INVENTION

The invention relates to the production of encased pipelines.

A non-polluting encased pipeline is known from the inventor's U.S. Pat. No. 3,802,456, consisting of a normal hydrocarbon pipe surrounded by a fluid-tight plastics jacket forming, about the pipe, an annular space for retaining a leak. This space contains a flexible netting of transversely-deformable longitudinal inserts defining ducts filled with a liquid or gaseous fluid under low pressure and leading to a tank equipped with a liquid detector. At least one of the inserts is grooved and the jacket is polygonal, the ends of the polygonal jacket sections being connected by flexible sealing junctions disposed about the inserts but spaced apart from the joints between the inserts which are placed end-to-end.

SUMMARY OF THE INVENTION

The present invention provides:

1. a process comprising on the one hand the production in a factory of units of, for example, twelve metres or more of an encased pipeline fully equipped with inserts and on the other hand the interconnection of these units on the site; and 2. the installation obtained by this process.

The process according to the invention is characterized by the fact that in a factory nettings of inserts, at least one of which includes a groove, are wrapped about pipe sections, and sections of the jacket of synthetic material, whose diameter D before tightening is slightly greater than the diametral distance between two opposed inserts, are slipped without friction over these nettings with the pipe sections in a vertical position; in that the overall length of the wrapped inserts is less than that of the pipe section whereas the overall length of the fitted jacket sections is less than that of the inserts in a manner such that each end of the unit has a stepped shape; in that the jacket sections are tightened by reducing them to an inner diameter $d$ while elastically compressing the inserts; in that the edges of the slots of the jacket sections are turned down into the grooves; in that the grooves are filled with a solidifiable mass; in that there is also fitted over the jacket section of each unit at least one short slotted jacket section having a length substantially twice that of each step; in that said short jacket section is temporarily attached in this waiting position; in that, on the site, the ends of the pipe sections are held together while turning the unit to be welded about its axis so that the grooved insert is in a plane at a tangent to the pipe section in spite of possible curvature thereof; in that the ends of the pipe sections are welded; in that a netting of inserts is wrapped about the step, i.e., between two units that have been welded; in that the short jacket section is slid from its waiting position to a final position between two units where it is tightened after having pivoted it and slid along a wire of the netting the grooved insert in a manner to be able to hook the plane edges of its slot in said groove; in that said edges of the short jacket section are turned down; in that said groove is filled; and in that a flexible and fluid-tight joint is provided between the polygonal ends of the jacket sections.

The installation obtained by this process is characterized in that between the jacket sections of two adjacent units, the short joining jacket section provides continuity in a fluid-tight manner; in that the inserts have recesses or channels to promote compression thereof and that said compression is accentuated at the convex summits of curves of the pipe sections and reduced at the concave summits; in that the groove is substantially parallel to the jacket section; in that along curves, the grooved insert that is made to slid along a cord of the netting forms an angle with the generatrices of the pipe section.

From the foregoing, it is seen that the installation comprises on the one hand the jacket sections of the units and on the other hand the joining jacket sections; and also that the height or compression of the inserts varies along the curvature of the pipe.

The characteristics of the inserts are preferably such as to achieve important functions, notably:

a. this cross-section is determined so that the flanges of the inserts may absorb the impulsion of a leaking jet;

b. their section is provided with recesses or channels to allow them to be unequally crushed along curves while maintaining contact both with the polygonal jacket and with the pipe;

c. a grooved insert, able to slip along the wires of the netting, serves for the solid attachment and fluid-tight closure of the jacket; along curves, this insert is parallel to the side of the generally polygonal jacket;

d. the inserts form therebetween leak-evacuation ducts; they space the pipe from the jacket; and they serve as support for windings forming part of flexible joints between the generally polygonal ends of the jacket sections.

Also, while along straight sections of the pipeline the grooves are, for convenience, preferably in the upper part, they are not necessarily in the upper part in curved zones of the pipeline.

BRIEF DESCRIPTION OF THE DRAWINGS

The invention will now be further described, by way of example, with reference to the accompanying drawings, in which.

DESCRIPTION OF THE PREFERRED EMBODIMENTS

Figure 1:
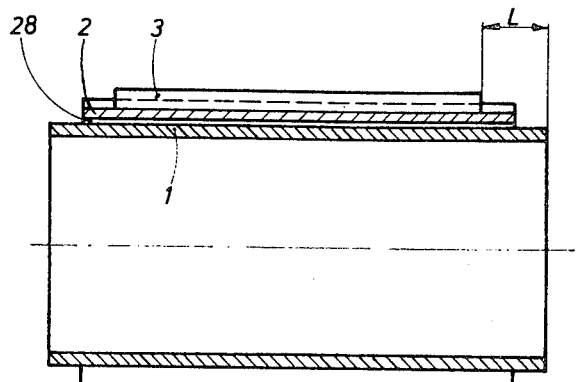
FIGS. 1 and 2 show a pipeline unit completed at the factory, FIG. 1 being a longitudinal cross-section and FIG. 2 a transverse cross-section; on FIG. 1 are seen the two terminal "steps" of the unit, each of length L.
Figure 2:
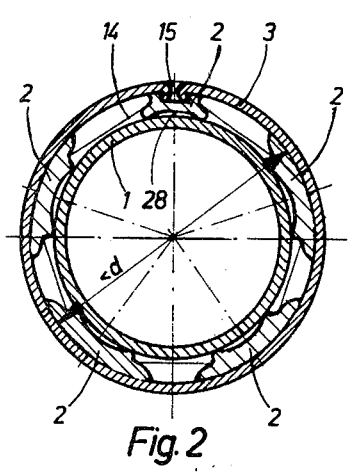

With reference to FIGS. 1 and 2, 1 shows a pipe section and 2 schematically shows transversely compressible elongate inserts of which 28 is an inner recessed part or channel, there being five inserts 2 in this example. The upper insert 2 has a longitudinal external groove receiving the turned down edges of jacket section 3. At 14 is shown one of the wires connecting the inserts 2 to form therewith a netting which is wrapped about the pipe section 1, and at 15 is shown a mass filling the groove, which mass, upon drying, fixes the edges of the jacket section 3.

FIG. 1 shows that the ends of the factory-prefabricated pipeline unit are step-shaped, each having a length L from the end of pipe section 1 to the corresponding end of jacket section 3.

Once the nettings are tightened on the pipe section 1 by the wires 14, and the jacket section 3 tightened on the nettings and hooked in the grooved insert, the assembly forms a transportable unit whose components are securely held together.

It should be noted that during tightening of the jacket section 3 on the netting, the recesses 28 of the inserts 2 are partially crushed, these inserts having a diametral distance before crushing of $d$, and being elastic whereby despite the curves in the pipe section 1 they remain bearing against both the jacket section 3 and the pipe section either with relaxation or with further compression thereof.

Figure 3:
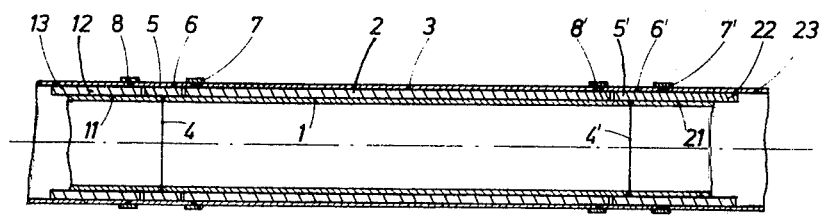
FIG. 3 is a longitudinal cross-section of part of the finished installation.
Figure 4:
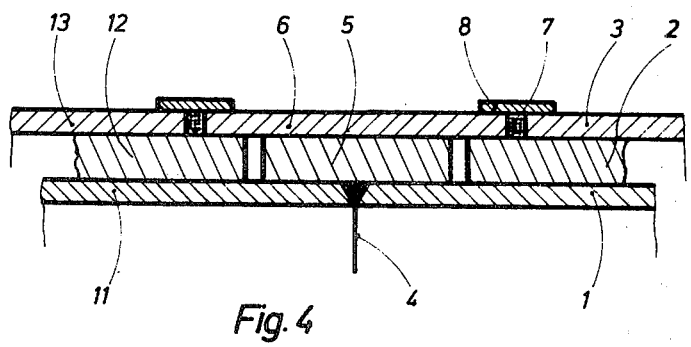
FIG. 4 is an enlarged cross-sectional view of the zone of welding of adjacent pipe sections, showing a short intermediate jacket section which covers the weld.

FIGS. 3 and 4 show an installation in which a tube section 1 is joined by welds 4 and 4' to adjacent tube sections 11 and 21. Because of the steps, the welding operations are not obstructed. Once the welding has been carried out, between each adjacent pair of inserts 2 and 12, 2 and 22 respectively is wrapped a short netting of which two inserts 5, 5' respectively are visible. About these nettings are placed short joining sections 6 and 6' of the jacket; the spaces between the ends of the jacket sections are filled by cords 7' wound about the inserts and said cords are covered by sealing bandages 8, these bandages overlapping onto the adjacent jacket sections. The jacket sections thus form a fluidtight generally polygonal succession of components 23, 6', 3, 6, 13 between which the gaps are closed by flexible means composed of cords and bandages.

It will be seen later, FIG. 7, that the short jacket sections such as 6 for filling the gaps between two units are fitted on the jacket sections 3 of the units in the factory in a waiting position and after welding are slid into the final position.

Figure 5:
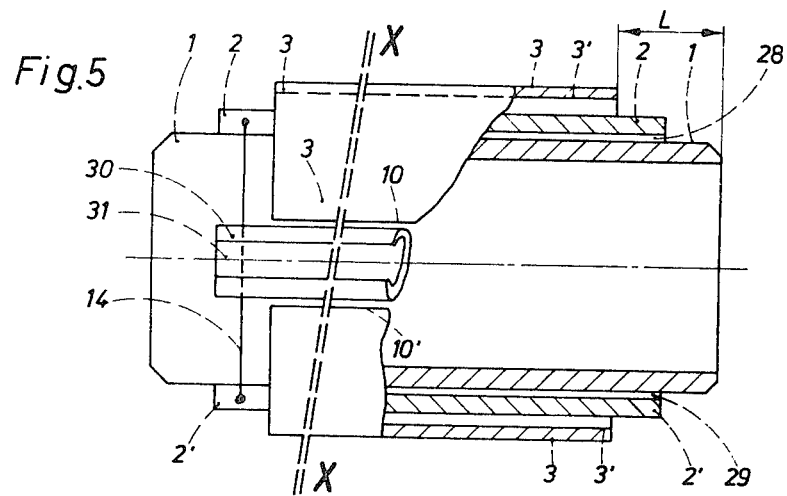
FIG. 5 is a cut-away side elevational view, partially in cross-section, showing in detail, during production at the factory, the unit of FIG. 1.

With reference to FIG. 5, cut away along X—X, about a pipe section 1 is wrapped a netting including two opposite inserts 2, 2' having recesses or channels 28 and 29. 3 is a jacket section having an inner wall 3'; at 30 is shown a grooved insert having a groove 31, and 14 shows one of the cords of the netting. The insert 30 is slidable along this and other cords 14 whereby it is not applied along a single generatrix of a curved pipe section, but is rectilinear and parallel to the lips 10 and 10' of the slot of the jacket section 3.

Figure 6:
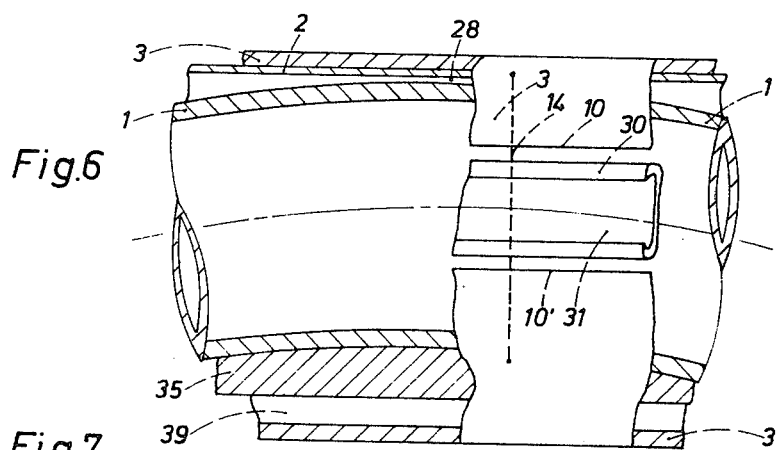
FIG. 6 is a side-elevational view, partly in cross-section, showing in detail, during production at the factory, part of a unit with a curved pipe section.

FIG. 6 shows a curved pipe section 1. At the summit of the convex part of pipe section 1 the recess 28 of insert 2 is crushed to the maximum whereas towards the ends of section 1 it is only slightly compressed. Thanks to its capacity of deformation, the insert 2 is applied on the one hand along nearly all its length against the jacket section 3 and on the other hand along all its length against the pipe section 1. If the curvature is very pronounced as is the case of a bend, it is advantageous to provide an insert having the shape of a dome as indicated at 35; 39 shows an outwardly-disposed recess which may be of varying thickness according to the pressure acting on the two flanges of this insert, and 14 shows a cord of the netting.

Figure 7:
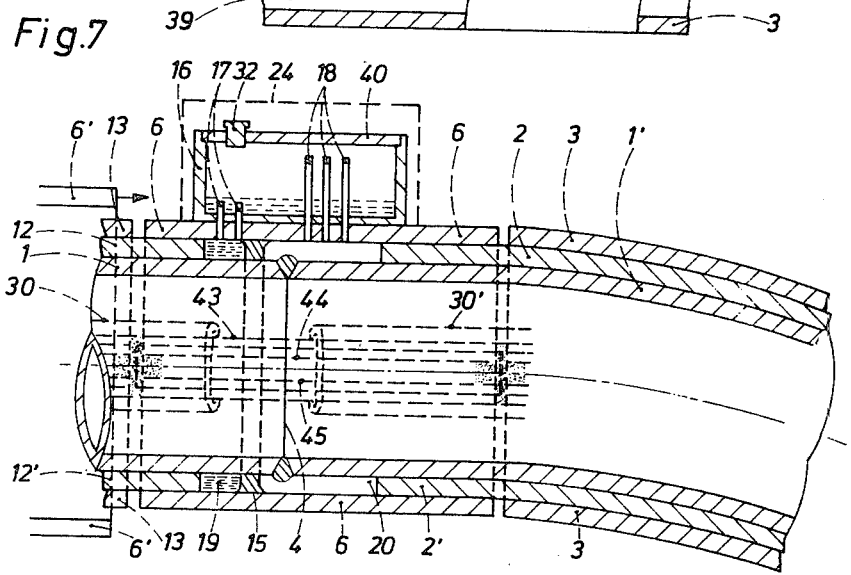
FIG. 7 is a cross-sectional view showing in detail a joint terminated at the site; this Figure also shows a change of the lay-out of the pipe-line, namely horizontally to the left and inclined to the right with a partition and a by-pass shaft on the short joining jacket section.

With reference to FIG. 7, two pipe sections 1 and 1' belonging to two adjacent units are welded at 4. About the jacket section 13 of the left-hand unit, is seen at 6' the short joining jacket section in its waiting position; after welding it is slipped into its final position 6 taking care that the edges 44 and 45 of its slot remain rectilinear despite a curve of the line. The fluid-tight sealing of this joining section is finished as has already been explained. It is observed that in the case shown of a change of curvature, a grooved partition 15 is provided to allow passage of a profile 43 inserted in the ends of the grooved inserts 30 and 30'; it is thus in this profile that the edges 44 and 45 of the slots of the jacket 6 are turned down.

In the case when the line changes curvature, passing for example from horizontal to inclined, the joining jacket section 6 may, as shown, be equipped at the factory with a chimney shaft 16 having a cover 40 and stopper 32 for filling with water of the horizontal sector, a by-pass of the partition 15 being formed on the one hand by a set of lower tubes 17 and on the other hand by a set of upper tubes 18. The hole for stopper 32 may be bored on the site when an adequate location of the chimney shaft on the periphery of the section has been determined. To simplify, and as the equipment has already been described for example in the inventor's U.S. Pat. No. 3,530,024, neither the tank nor its piping have been shown, this piping in the illustrated example leading into the right hand part of the partition; 24 shows in outline a protective casing placed on the chimney shaft.

In the finished pipeline, there is no play between the jacket and the inserts; in other words, the static load of the earth, transmitted by the latter and by the inserts to the pipe, does not deform the jacket; the curvature of the hydrocarbon pipeline is compensated by the differences in the deformation of the recesses or channels of the inserts.

What is claimed is:

1. A method of constructing a pipeline having an inner pipe surrounded by an outer jacket, comprising:
   providing a plurality of pipe sections;
   wrapping about each pipe section a first section of netting including a plurality of transversely deformable elongated inserts extending longitudinally along the pipe section and circumferentially spaced thereon, at least one of said inserts having an outer longitudinal groove, said inserts being shorter axially than the corresponding pipe section and the ends of the inserts being spaced inwardly from the ends of the corresponding pipe section;
   sliding over the first netting of inserts on each pipe section a primary slotted jacket section having opposed longitudinal edges defining a longitudinal slot, each jacket section being axially shorter than the inserts of the first netting and being spaced inwardly from the ends of the pipe section and from the ends of the inserts;
   compressing each primary jacket section inwardly onto the inserts of each pipe section;
   deforming inwardly said longitudinal edges of each primary jacket section and turning them down into a corresponding longitudinal groove of a corresponding grooved insert;

filling each groove with a solidifiable mass and solidifying each mass to provide a fluid-tight connection of each primary jacket section and its grooved insert, to provide a plurality of transportable units each forming a section of the finished pipeline;

sliding over the primary jacket sections of said transportable units a corresponding plurality of relatively short secondary slotted jacket sections having opposed longitudinal edges defining a longitudinal slot and each having a length substantially equal to twice the distance between an end of a primary jacket section and the corresponding end of the associated pipe section;

placing said pipe sections of the transportable units end-to-end with said grooved inserts of adjacent assemblies at least approximately aligned;

welding together the adjacent ends of said pipe sections;

wrapping about the exposed parts of the welded pipe sections second sections of said netting each having a grooved insert and aligning the grooved inserts thereof with the grooved inserts of the adjacent units;

sliding said secondary jacket sections along the primary jacket sections to dispose each between the adjacent ends of a pair of primary jacket sections, and aligning the slots of said secondary jacket sections generally with the inwardly turned edges of the primary jacket sections and with the underlying grooves of the grooved inserts of said first and second sections of netting;

compressing inwardly each secondary jacket section onto the underlying inserts;

deforming inwardly said longitudinal edges of said secondary jacket section to turn them down into the underlying longitudinal grooves of the corresponding grooved inserts;

filling said longitudinal grooves along the secondary jacket sections with a solidifiable mass and solidifying each mass to provide a fluidtight connection of each secondary jacket section on the grooved inserts; and providing flexible fluid-tight joints between the adjacent ends of the primary and secondary jacket sections.

2. A pipeline comprising a pipe, and an outer annular jacket surrounding the pipe and forming therewith an annular space containing a netting of longitudinal inserts, wherein the pipeline is composed of a plurality of units each forming a section of the finished pipeline, and means for connecting the units, each unit comprising:

a pipe section;

a first section of netting wrapped about the pipe section, said first section of netting including a plurality of transversely deformable elongated inserts extending longitudinally along the pipe section and circumferentially spaced thereon, one of said inserts comprising a grooved insert having an outer longitudinal groove, said inserts being shorter than the pipe section and the ends of said inserts being spaced from the ends of the pipe section;

a primary slotted jacket section having adjacent longitudinal edges, said primary jacket section being shorter than the inserts of the first section of netting and being spaced from the ends of the pipe section and from the ends of said inserts, said longitudinal edges of the primary jacket section being turned inwardly into said longitudinal groove with the primary jacket section compressed onto the inserts of the pipe section; and a solidified mass filling said groove to provide a fluid-tight connection of the primary jacket section and its grooved insert;

and said connectig means comprising for each adjacent pair of units:

a weld joint uniting the adjacent ends of said pipe sections placed end-to-end with said grooved inserts of the adjacent units at least approximately aligned;

a second section of said netting having a grooved insert and wrapped about the ends of the welded pipe sections between said first sections of netting with the grooved insert thereof aligned with the grooved inserts of the adjacent units;

a secondary slotted jacket section having adjacent longitudinal edges, said secondary jacket section being disposed between the adjacent ends of the primary jacket sections with said longitudinal edges thereof turned inwardly into the longitudinal groove of the grooved inserts of the first and second sections of netting and with the secondary jacket section compressed onto the underlying inserts;

a solidified mass filling each said groove along the secondary jacket section to provide a fluid-tight connection of the secondary jacket section on the grooved inserts; and flexible fluid-tight joints between the adjacent ends of the primary and secondary jacket sections.

3. A pipeline according to claim 2, in which said pipe includes curved pipe sections, and said inserts include longitudinal recesses permitting the compression thereof, the inserts at extreme convex parts of the curved sections being compressed greater than the inserts at the extreme concave parts of the curved sections.

4. A pipeline according to claim 3, in which said netting comprises wires joining said inserts, and in which said grooved inserts and slidable transversely along the joining wires of said netting, and along said curved pipe sections, said grooved inserts are disposed with the groove thereof parallel to the corresponding jacket section and making an angle with the generatrices of said curved pipe sections.

5. A pipeline according to claim 2, in which said inserts define ducts therebetween along said annular space, filled with a liquid or gaseous fluid:

6. A pipeline according to claim 2, in which said flexible fluid-tight joints are supported by the inserts of said first nettings.

7. A pipeline according to claim 2, comprising at least one U-shaped sectional piece inserted in the grooves of adjacent grooved inserts, said longitudinal edges of the corresponding secondary jacket section being turned down into said sectional piece.

8. A pipeline according to claim 2, in which the jacket sections have a generally polygonal cross-section.

* * * * *